United States Patent
Lee et al.

(10) Patent No.: US 12,049,526 B2
(45) Date of Patent: Jul. 30, 2024

(54) OLEFIN POLYMERIZATION METHOD USING ANTISTATIC AGENT FOR METALLOCENE OLEFIN POLYMERIZATION PROCESS

(71) Applicant: DL CHEMICAL CO., LTD., Seoul (KR)

(72) Inventors: Jang Woo Lee, Gyeonggi-do (KR); Sung Woo Kang, Daejeon (KR); Byung Soon Chun, Daejeon (KR); Soon Jae Kwon, Daejeon (KR)

(73) Assignee: DL CHEMICAL CO., LTD., Seoul (KR)

( * ) Notice: Subject to any disclaimer, the term of this patent is extended or adjusted under 35 U.S.C. 154(b) by 287 days.

(21) Appl. No.: 17/560,211

(22) Filed: Dec. 22, 2021

(65) Prior Publication Data

US 2022/0195083 A1    Jun. 23, 2022

(30) Foreign Application Priority Data

Dec. 23, 2020 (KR) .......................... 10-2020-0182068

(51) Int. Cl.
*C08F 110/02* (2006.01)
*B01J 8/00* (2006.01)
(Continued)

(52) U.S. Cl.
CPC .............. *C08F 210/02* (2013.01); *B01J 8/003* (2013.01); *B01J 8/1809* (2013.01); *B01J 8/1872* (2013.01);
(Continued)

(58) Field of Classification Search
CPC ......... C08F 2/001; C08F 2410/02; C08F 4/64
See application file for complete search history.

(56) References Cited

U.S. PATENT DOCUMENTS 4,012,574 A    3/1977 Jones et al.
4,532,311 A    7/1985 Fulks et al.
(Continued)

FOREIGN PATENT DOCUMENTS

EP    0453116 A1    10/1991
EP    0549252 A1    6/1993
(Continued)

OTHER PUBLICATIONS

European Search Report dated May 9, 2022 corresponding to application No. EP21214272.
(Continued)

*Primary Examiner* — Rip A Lee
(74) *Attorney, Agent, or Firm* — Nath, Goldberg & Meyer; Joshua B. Goldberg (57) ABSTRACT

Disclosed is an antistatic agent for a metallocene olefin polymerization process and a polymerization method using the same, by which discontinuity event due to sheeting or drooling occurring in the olefin polymerization process can be effectively reduced, enabling continuous operation for a long time, and the obtained final product can be applied to various applications including food contact use. The present disclosure includes an olefin polymerization method, which comprises forming a mixture in which an antistatic agent containing diglycerol oleate is mixed with a low molecular weight hydrocarbon, supplying the antistatic agent mixture and a metallocene-based catalyst composition comprising a metallocene catalyst and aluminoxane to two or more polymerization reactors, and polymerizing one or more alpha-olefins in the presence of the antistatic agent mixture and catalyst composition.

6 Claims, 2 Drawing Sheets

(51) Int. Cl.
  *B01J 8/18* (2006.01)
  *C08F 2/00* (2006.01)
  *C08F 2/34* (2006.01)
  *C08F 4/659* (2006.01)
  *C08F 4/6592* (2006.01)
  *C08F 210/02* (2006.01)
  *C08F 210/14* (2006.01)
  *C08K 5/01* (2006.01)
  *C08K 5/103* (2006.01)

(52) U.S. Cl.
  CPC ............ *C08F 2/001* (2013.01); *C08F 2/34* (2013.01); *C08F 4/65916* (2013.01); *C08F 4/65922* (2013.01); *C08F 210/14* (2013.01); *C08K 5/01* (2013.01); *C08K 5/103* (2013.01); *B01J 2219/00186* (2013.01); *C08F 2410/02* (2013.01); *C08K 2201/017* (2013.01)

(56) References Cited

U.S. PATENT DOCUMENTS

| | | | |
|---|---|---|---|
| 4,803,251 A | 2/1989 | Goode et al. | |
| 4,855,370 A | 8/1989 | Chirillo et al. | |
| 5,066,736 A | 11/1991 | Dumain et al. | |
| 5,126,414 A | 6/1992 | Cooke et al. | |
| 5,283,278 A * | 2/1994 | Daire | C08F 10/00 524/400 |
| 5,332,706 A | 7/1994 | Nowlin et al. | |
| 5,391,657 A | 2/1995 | Song et al. | |
| 5,405,922 A | 4/1995 | Dechellis et al. | |
| 5,427,991 A | 6/1995 | Turner | |
| 5,436,304 A | 7/1995 | Griffin et al. | |
| 5,461,123 A | 10/1995 | Song et al. | |
| 5,473,028 A | 12/1995 | Nowlin et al. | |
| 5,492,975 A | 2/1996 | Peifer et al. | |
| 5,610,244 A | 3/1997 | Govoni et al. | |
| 5,627,243 A | 5/1997 | Hämäläinen et al. | |
| 5,643,847 A | 7/1997 | Walzer, Jr. | |
| 5,661,095 A | 8/1997 | Meverden et al. | |
| 6,548,610 B2 | 4/2003 | Bartilucchi et al. | |
| 6,627,706 B1 * | 9/2003 | Follestad | C08F 10/00 526/170 |
| 8,536,289 B2 * | 9/2013 | Caputo | C08J 7/123 526/204 |
| 8,735,514 B2 * | 5/2014 | Baita | C08F 4/16 526/74 |
| 9,574,026 B2 * | 2/2017 | Covezzi | C09J 123/20 |
| 10,544,245 B1 * | 1/2020 | Vantomme | B01J 19/245 |
| 2008/0027185 A1 | 1/2008 | Markel et al. | |

FOREIGN PATENT DOCUMENTS

| | | | | |
|---|---|---|---|---|
| JP | 2017-145351 A | * | 8/2017 | ............ C08F 2/44 |
| JP | 2020-33483 A | | 3/2020 | |
| KR | 10-2004-0061926 A | * | 7/2004 | ........ C08F 110/02 |
| WO | 96/08520 A1 | | 3/1996 | |
| WO | 97/06186 A1 | | 2/1997 | |
| WO | 97/14721 A1 | | 4/1997 | |
| WO | 97/15602 A1 | | 5/1997 | |
| WO | 97/27224 A1 | | 7/1997 | |
| WO | 97/46599 A1 | | 12/1997 | |
| WO | 2011080128 A1 | | 7/2011 | |
| WO | 2020136443 A1 | | 7/2020 | |

OTHER PUBLICATIONS

Office Action dated Sep. 19, 2022 issued in corresponding Korean Application No. 10-2020-0182068.

\* cited by examiner

OLEFIN POLYMERIZATION METHOD USING ANTISTATIC AGENT FOR METALLOCENE OLEFIN POLYMERIZATION PROCESS

CROSS-REFERENCE TO RELATED APPLICATION

This application claims benefit of priority to Korean Patent Application No. 10-2020-0182068 filed on Dec. 23, 2020, the entire contents of which are incorporated herein by reference.

FIELD OF THE DISCLOSURE

The present disclosure relates to an olefin polymerization method using an antistatic agent for a metallocene olefin polymerization process. More specifically, the present disclosure relates to an olefin polymerization method using an antistatic agent for a metallocene olefin polymerization process, by which a discontinuity event due to a sheeting or drooling phenomenon occurring in the olefin polymerization process can be effectively reduced, enabling continuous operation for a long time, and the obtained final product can be applied to various applications such as for food contact use.

BACKGROUND

Polyolefins prepared using metallocene catalysts, characterized by a narrow molecular weight distribution and narrow chemical composition, provide products with improved structural performance, such as high impact strength and transparency in films.

Despite these advantages of metallocene catalysts, "sheeting" or "drooling" may occur when the metallocene catalyst is used in a conventional polymerization system, particularly a fluidized bed reactor. See U.S. Pat. Nos. 5,436,304 and 5,405,922. Sheeting is an adhesion of fused catalyst and resin particles to a reactor wall. Drooling (or "dome sheet") is the same as sheeting in that it is an adhesion of fused catalyst and resin particles to a reactor wall, except that the location of occurrence is a conical portion of the dome or a hemispherical head on the top of the reactor. The sheeting can be a problem in commercial gas phase polyolefin production reactors if not adequately mitigated. The problem is characterized by the formation of large solid masses of polymer on the walls of the reactor. These solid masses or polymers (sheets) eventually remove from the walls and fall into the reaction compartment, where they impede fluidization, block a product outlet, and eventually force the reactor to shut down.

Accordingly, various sheeting control methods have been developed. This often involves monitoring a static charge near the reactor walls in areas where sheeting is known to form, and introducing a static control agent into the reactor if the static level is outside a certain range. For example, U.S. Pat. Nos. 4,803,251 and 5,391,657 disclose the use of various chemical additives in fluidized bed reactors to control the static charge in the reactor. U.S. Pat. Nos. 4,803,251 and 5,391,657 disclose that static electricity plays an important role in sheeting processes using Ziegler-Natta catalysts. When the static charge level on the catalyst and resin particles exceeds a certain critical level, the particles are attached to the grounded metal wall of the reactor by static forces. Excessive temperatures can cause particles to sinter and melt, creating sheets or drools, if allowed to remain in the wall long enough under a reactive environment.

U.S. Pat. No. 4,532,311 discloses the use of a reactor electrostatic probe (voltage probe) to obtain an indication of the degree of electrification of a fluidized bed. U.S. Pat. No. 4,855,370 combines a charge of water into the reactor (in an amount of 1 to 10 ppm of ethylene feed) and an electrostatic probe to control the level of static in the reactor. This method has proven effective for Ziegler-Natta catalysts, but not for metallocene catalysts. U.S. Pat. No. 6,548,610 discloses methods to prevent dome sheeting (or "drooling") by measuring the static charge using a Faraday drum and supplying a static control agent, if necessary, to the reactor to keep the measured charge within a predetermined range.

When metallocene catalysts are used, various techniques for improving process stability have been developed. For example, various supportive procedures or methods for preparing metallocene catalyst systems with reduced fouling tendencies and good operability are discussed in U.S. Pat. No. 5,283,278, which also includes prepolymerization of metallocene catalysts. Other supportive methods are described in U.S. Pat. Nos. 5,332,706, 5,473,028, 5,427,991, 5,643,847, 5,492,975 and 5,661,095, and International Patent Publication Nos. WO 97/06186, WO 97/15602 and WO 97/27224. Other literature discusses various variants for improving reactor continuity using metallocene catalysts and conventional Ziegler-Natta catalysts. See International Patent Publication Nos. WO 96/08520, WO 97/14721 and U.S. Pat. Nos. 5,627,243, 5,461,123, 5,066,736, 5,610,244, 5,126,414 and European Patent No. EP 0549252. Various other methods exist to improve operability, including coating a polymerization equipment, particularly controlling a polymerization rate upon initiation, and changing a reactor design and injecting various agents into a reactor.

Regarding the injection of various additives into a reactor, antistatic agents (anti-electrostatic agents) and process "continuous additives" have been the subject of various publications. For example, EP 0453116 discloses the introduction of an antistatic agent into the reactor in order to reduce the amount of sheets and agglomerates. U.S. Pat. No. 4,012,574 discloses the addition of surface-active compounds having perfluorocarbon groups to a reactor to reduce contamination. International Patent Publication No. WO 97/46599 discloses that a catalyst feed stream may contain an antifouling or antistatic agent, such as Atmer 163 (available from ICI Specialty Chemicals, Baltimore, MD). Although many references, including this patent, mention antistatic agents, in most cases, static electricity is never completely removed. Rather, it reduces it to an acceptable level by generating an opposite charge to that present in the polymerization system. In this regard, these "antistatic" agents are actually "prostatic" agents that create a compensating charge that reduces the net static charge in the reactor.

As described in U.S. Patent Application Publication No. 2008/027185, aluminum stearate, aluminum distearate, ethoxylated amines, Octastat 2000, mixtures of polysulfone copolymers with polyamines and oil soluble sulfonic acids (Statsafe), as well as mixtures of carboxylated metal salts with amine-containing compounds, such as those sold under the trade names Kemamine™ and Atmer™ can be used to control the level of static in the reactor.

The static control agents described above can result in reduced catalyst productivity. The reduced productivity may exist as a result of residual moisture in the additive. The reduced productivity may also be due to the interaction of polymerization catalysts with static control agents, such as reaction or complexation with hydroxyl groups in the static control agent compound. A loss of catalytic activity of at least 40% was observed, depending on the static control agent used and the amount of static control agent needed to suppress sheeting.

In accordance with the foregoing, there is a need for additives useful in controlling the level of static in the reactor and thus the sheeting, particularly when a metallocene catalyst system is applied to a fluidized bed reactor.

SUMMARY OF THE INVENTION

Technical Objects

Accordingly, an object of the present disclosure is to provide an olefin polymerization method using an antistatic agent for a metallocene olefin polymerization process including diglycerol oleate.

Another object of the present disclosure is to provide an olefin polymerization method using an antistatic agent for a metallocene olefin polymerization process, by which a discontinuity event can be effectively reduced so that continuous operation for a long time is possible, and the obtained final product can be applied to various applications such as for food contact use.

Technical Solution

In order to achieve the above objects, the present disclosure provides an olefin polymerization method, which includes forming a mixture in which an antistatic agent containing diglycerol oleate is mixed with a low molecular weight hydrocarbon; supplying the antistatic agent mixture and a metallocene-based catalyst composition comprising a metallocene catalyst and an aluminoxane to two or more polymerization reactors; and polymerizing one or more alpha-olefins in the presence of the antistatic agent mixture and catalyst composition.

Effects of the Invention

In the olefin polymerization method using the antistatic agent for the metallocene olefin polymerization process according to the present disclosure, the use of diglycerol oleate as an antistatic agent can effectively reduce the discontinuity events, enabling long-term continuous operation, and the resulting final product can be used to prepare polyolefin polymers applicable to a variety of applications such as food contact applications.

DETAILED DESCRIPTION OF THE PREFERRED EMBODIMENTS

Hereinafter, the present disclosure will be described in detail. If necessary, in the following description, the polyolefin resin is simply called a polymer or a polyolefin, an ethylene-based polymer, a polymer, an olefin polymer, or the like.

The olefin polymerization method using an antistatic agent for the metallocene olefin polymerization process according to the present disclosure includes forming a mixture in which an antistatic agent containing diglycerol oleate is mixed with a low molecular weight hydrocarbon; supplying the antistatic agent mixture and a metallocene-based catalyst composition comprising a metallocene catalyst and an aluminoxane to two or more polymerization reactors; and polymerizing one or more alpha-olefins in the presence of the antistatic agent mixture and catalyst composition.

The antistatic agent serves to effectively remove static electricity generated in the polymerization process of olefins such as ethylene or propylene. Specifically, it is possible to lower the level of static electricity generated in the polymerization reactor to a level that can cause a discontinuity event due to phenomena such as sheeting and drooling, so that the formation of a laminate of polymers on the wall of the reactor can be prevented, eliminated, or reduced.

The antistatic agent is a liquid antistatic agent, and includes diglycerol oleate, a component extracted from palm oil. In particular, when diglycerol oleate is used as an antistatic agent in an olefin polymerization process using a metallocene catalyst, it may be useful as an antistatic agent. Since diglycerol oleate used as the antistatic agent is a component extracted from palm oil, products made using the antistatic agent can be safely used for food contact applications.

By forming a mixture in which diglycerol oleate used as an antistatic agent according to the present disclosure is mixed with a low molecular weight hydrocarbon, the antistatic agent of the mixture is introduced into a polymerization reactor system and used in an olefin polymerization process. The low molecular weight hydrocarbon is a hydrocarbon having 6 to 40 carbon atoms, preferably a saturated hydrocarbon having 6 to 36 carbon atoms, and is specifically selected from the group consisting of hexane, heptane, toluene, mineral oil and mixtures thereof. More specifically, hexane is selected and used. The concentration of diglycerol oleate in the mixture of diglycerol oleate and low molecular weight hydrocarbon is preferably 0.1 to 100% by weight, specifically 0.1 to 50% by weight, and more specifically 0.5 to 10% by weight based on the total mixture.

At least two polymerization reactors for the polymerization of polyolefin polymers according to the present disclosure are suitable for homopolymerization of ethylene and copolymerization with optional alpha-olefin comonomers, by solution, slurry or gas phase polymerization apparatus. Particularly suitable are polymerization apparatuses used in slurry or gas phase polymerization processes. More specifically, the at least one polymerization reactor system preferably uses a polymerization process in which at least one reactor selected from the group consisting of a gas phase reactor, a slurry reactor and a solution reactor is connected in series. Specifically, a polymerization reactor in which one or more pre-polymerization reactors selected from the group consisting of a loop reactor for pre-polymerization, a CSTR reactor for pre-polymerization, and a fluidized bed reactor and one or more fluidized bed reactors are connected in series may be used.

The polymerization reaction conditions according to each polymerization reactor system can be variously modified depending on the type of metallocene catalyst component, the composition of supported catalyst, the type of monomer and comonomer, polymerization method (for example, solution polymerization, slurry polymerization, gas phase polymerization, etc.), desired polymerization result or the type of polymers. For example, in such an olefin polymerization reaction, the olefin polymerization process may be usually performed at about 20 to 200° C. of polymerization reaction temperature and 10 to 7,000 psig of polymerization pressure.

The density of the olefin polymer prepared using the antistatic agent according to the present disclosure can be controlled by changing the polymerization temperature or by changing the comonomer concentration in the reactor. The molecular weight of the polyolefin of the present disclosure can be controlled by changing the polymerization temperature or by changing the hydrogen concentration in the reactor.

Polymerization Method

Figure 1:
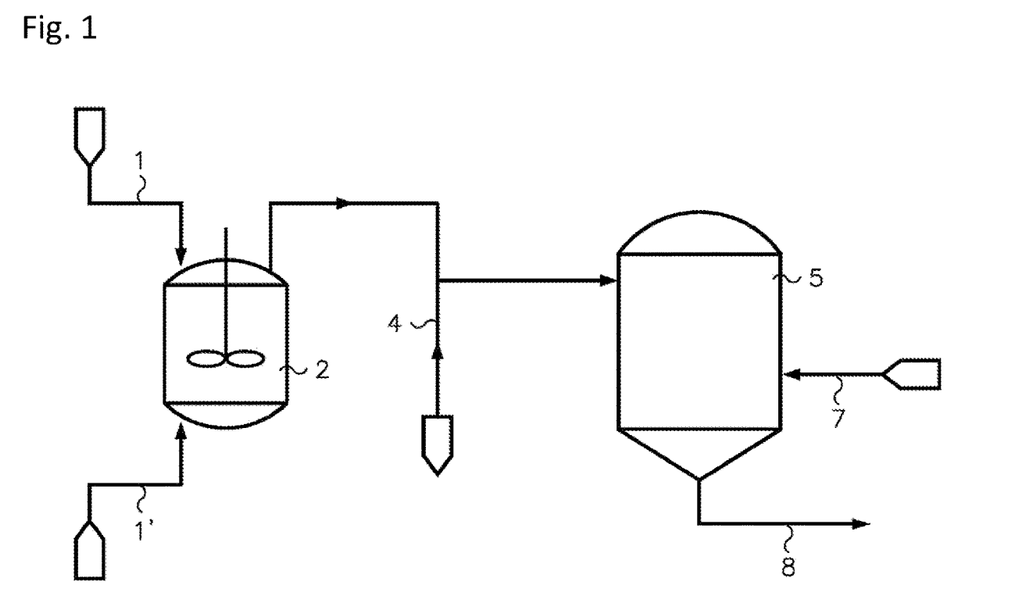
FIG. 1 shows an olefin polymerization method according to an embodiment of the present disclosure.

In the olefin polymerization method according to the present disclosure, the antistatic agent mixture in which the low molecular weight hydrocarbon and diglycerol oleate are mixed is continuously supplied to the catalyst composition and the polymerization reactor. FIG. 1 exemplarily shows an olefin polymerization method according to the present disclosure. Specifically, the antistatic agent mixture (1, 4, 7) and the catalyst composition (1') are each independently fed to two or more polymerization reactors (2, 5). The polymerization reactor system may include solution, gas phase, slurry phase and high pressure processes or combinations thereof. Specifically, in an exemplary embodiment of the present disclosure, gas phase polymerization of ethylene, an olefinic monomer, and 1-hexene, an alpha-olefin comonomer, is provided. In the polymerization reactor, a prepolymerization loop reactor (2) for prepolymerizing ethylene and one or more alpha-olefins in the presence of a metallocene-based catalyst composition (1') and an antistatic agent mixture (1), and a fluidized bed reactor (5) for polymerizing the prepolymer to obtain an olefin polymer are connected in series. In the polymerization reactor, the olefin polymer may be formed by a conventional polymerization process (e.g., pre-polymerization and/or main polymerization process). For example, the metallocene catalyst composition (1') and the antistatic agent mixture (1) are introduced into the prepolymerization loop reactor (2), wherein ethylene and alpha olefin may be added alone or mixed, and hydrogen as a molecular weight regulator may be added together to form a prepolymer under constant reaction conditions. The prepolymer may be introduced into the fluidized bed reactor (5) to form an olefin polymer (8) under constant reaction conditions. The polymerization process system of the present disclosure is suitable for use in any prepolymerization and/or polymerization process over a wide range of temperatures and pressures. The polymerization temperature in the prepolymerization reactor ranges from −60° C. to about 280° C., preferably from 0° C. to about 150° C., more specifically from 30° C. to 100° C., and alternatively from 30° C. to 60° C. The polymerization temperature in the fluidized bed reactor ranges from −60° C. to about 280° C., preferably from 50° C. to about 200° C., more specifically from 60° C. to 120° C., and alternatively from 60° C. to 90° C.

The antistatic agent mixture may be fed to the polymerization reactor independently or together with the metallocene catalyst composition. Specifically, when the antistatic agent mixture and the metallocene catalyst composition are each independently supplied, the antistatic agent mixture and the catalyst composition are continuously injected into the polymerization reactor through independent feeding lines, and may also be introduced at one or more positions selected from the group consisting of a reactor front end, a reactor rear end, a reactor interior and a recycle circulation line with respect to the polymerization reactor.

When the antistatic agent mixture and the catalyst composition are supplied together, the antistatic agent mixture and the catalyst composition are continuously injected into independent feeding lines, respectively, but before the two independent lines reach the polymerization reactor system, they are joined together in a line connected to the polymerization reactor, and then are introduced into the polymerization reactor. Alternatively, the antistatic agent mixture and the catalyst composition may be stirred for a predetermined time in a separate stirrable vessel, and then supplied to the polymerization reactor through a line connected to the reactor.

The polymerization process of the present disclosure further includes continuously injecting a liquid antistatic agent before, during, and after polymerization in order to remove static electricity generated in the reactor. The injection location of the antistatic agent may include a front/rear end of the reactor, a reactor, and a catalyst storage tank. Specifically, the antistatic agent is supplied to the prepolymerization loop reactor (2), the fluidized bed reactor (5) and a line (4) connecting the prepolymerization loop reactor and the fluidized bed reactor, respectively. In this case, the antistatic agent is preferably a mixture of antistatic agents mixed with a low molecular weight hydrocarbon. When the antistatic agent is used alone without mixing with a low molecular weight hydrocarbon, since the input amount of the antistatic agent is used in a relatively small amount compared to the produced polymer, for example, in a very small amount of ppm level, there is a problem in that quantitative injection is difficult, and due to the high viscosity of the antistatic agent itself, a separate input equipment such as a high-viscosity transfer pump is required, which may complicate the process.

When it is determined that the material flow inside the reactor due to static electricity is not smooth by monitoring the internal temperature, pressure, and density profile of the polymerization reactor, the amount of the antistatic agent is increased to lower the static electricity level. When an appropriate amount of antistatic agent is added, the material flow inside the reactor becomes smooth again. Since the level of static electricity generated depends on the type of catalyst used, process conditions, and the molecular weight, molecular weight distribution and density of the polymer to be produced, the amount of the antistatic agent input must also be appropriately adjusted according to the level of static electricity generated. Preferably, the total concentration of the antistatic agent is preferably from 1 to 2,000 parts per million weight (ppmw), specifically from 2 to 1,000 ppmw, more specifically from 2 to 200 ppmw, more specifically from 50 to 60 ppmw in the polymer product. When the concentration of the diglycerol oleate is less than 1 ppmw, static removal performance and catalyst productivity (e.g., mileage, weight of polymer formed per unit weight of catalyst) are lowered. When the concentration of the diglycerol oleate exceeds 2,000 ppmw, the catalyst productivity is greatly reduced. The term "ppmw" indicates parts per million weight, for example, 2,000 ppmw means that diglycerol oleate is contained as much as 0.2 wt % of the polymer product present in the reactor.

In addition, in the at least one polymerization reactor, the flow rate of diglycerol oleate may be different. For example, according to an embodiment of the present disclosure, the flow rate of diglycerol oleate in the loop reactor for prepolymerization is 10 to 100 g/h, preferably 50 g/h, for the polymer product. The flow rate of diglycerol oleate in the fluidized bed reactor is 5 to 50 g/h, preferably 20 g/h. The flow rate of diglycerol oleate in the line connecting the loop reactor for prepolymerization and the fluidized bed reactor is 5 to 50 g/h, preferably 20 g/h.

In addition, the catalyst productivity (mileage) is the weight of the polymer formed per unit catalyst weight, and the mileage (catalyst productivity) in the input amount of the diglycerol oleate is 1,000 g/g or more, preferably 1,400 g/g or more.

The olefin polymer according to the present disclosure is one in which at least one alpha-olefin is polymerized, and specifically, it is preferably a copolymer of ethylene, which is an olefinic monomer, and an alpha-olefin comonomer. As the comonomer, an alpha-olefin having 3 or more carbon atoms may be used. The comonomer having 3 or more carbon atoms may include, for example, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene or 1-eicosene. The content of the alpha-olefin comonomer may be 1 to 4 mol %, preferably 1.4 to 4 mol %, based on 100 mol % of the ethylene and alpha-olefin copolymer, but is not limited thereto. If the content of the alpha-olefin comonomer is less than 1 mol %, a decrease in production may occur due to a decrease in the activity of the catalyst system. If the content exceeds 4 mol %, the resin melting point is low, and sheeting may occur in the reactor during vapor phase polymerization.

The weight average molecular weight (Mw) of the olefin polymer prepared according to the present disclosure may be 50,000 to 200,000 g/mol, preferably 60,000 to 170,000 g/mol, more preferably 100,000 to 160,000 g/mol, but is not limited thereto. If the weight average molecular weight (Mw) of the polyolefin resin is less than 50,000, low physical properties and fumes may be generated during extrusion processing. If the weight average molecular weight (Mw) exceeds 200,000, extrusion processing efficiency may be lowered (i.e., high energy consumption per extrusion amount).

The polyolefin resin according to the present disclosure is composed of a copolymer of ethylene and an alpha-olefin comonomer. The polyolefin resin has a melt index (MI2.16, 190° C., 2.16 kg load condition) of 0.01 to 15 g/10 min, specifically 0.03 to 10 g/10 min, and a density of 0.88 to 0.98 g/cm3, specifically 0.90 to 0.96 g/cm3.

The metallocene-based catalyst composition according to the present disclosure may include a metallocene-based supported catalyst, specifically, a metallocene catalyst and aluminoxane, and more specifically, a metallocene catalyst, aluminoxane, and a porous carrier.

The metallocene catalyst component may include one or more metallocene compounds, and specifically, various metallocene components commonly used in ethylene polymerization may be used without limitation, but it is preferable to use a metallocene compound represented by the following formula (1).

Formula 1 wherein, Cp is a cyclopentadienyl radical; R1 and R2 are each independently hydrogen, phosphine, amino, alkyl having 1 to 20 carbon atoms, alkoxy, alkylamino, dialkylamino, alkoxy-alkyl, alkenyl having 2 to 20 carbon atoms, aryl having 6 to 20 carbon atoms, aryloxy-alkyl, alkylaryl, or arylalkyl radical, such as methyl, 1-propyl, 1-butyl, methoxy, etc., and preferably, at least one of 1-propyl or 1-butyl is included. M is a Group 4 transition metal of the periodic table, that is, titanium, zirconium, hafnium, X is each independently halogen (e.g., chloride (Cl), etc.), alkyl having 1 to 20 carbon atoms, alkoxy, alkenyl having 2 to 20 carbon atoms, aryl having 6 to 20 carbon atoms, alkylaryl, arylalkyl or aryloxy radicals, such as chloride, methyl, benzyl and the like.

The aluminoxane acts as an activator or co-catalyst, and is generally known to be suitable for olefin polymerization, including methylaluminoxane (MAO) or modified methylaluminoxane (MMAO; Modified MAO), as well as any commercially available aluminoxane. The aluminoxane can be prepared by adding an appropriate amount of water to trialkylaluminum, or by reacting a hydrocarbon or inorganic hydrate salt containing water with trialkylaluminum. The aluminoxane is generally in the form of hydrocarbyl aluminoxane, which is a linear or circular oligomer. A typical linear aluminoxane is a compound represented by the following formula (2), and a typical circular aluminoxane is a compound represented by the following formula (3).

Formula 2

Formula 3

In Formulae 2 and 3, R' is a hydrocarbon radical, preferably a linear or branched alkyl radical having 1 to 10 carbon atoms. In Formulae 2 and 3, preferably most of R' is a methyl group, more preferably 30 to 100% of the repeating unit, and most preferably 50 to 70% of the repeating unit is a methyl group. In Formula 2, x is an integer of 1 to 50, preferably 4 to 30, and in Formula 3, y is an integer of 3 to 50, preferably 4 to 30.

The aluminoxane is commercially available in the form of several kinds of hydrocarbon solutions. Among them, it is preferable to use an aromatic hydrocarbon solution aluminoxane, and more preferably aluminoxane dissolved in toluene is used.

As the porous carrier, porous particles having a stable structure such as inorganic oxides or inorganic salts may be used without limitation. Practically useful carriers are inorganic oxides of elements belonging to groups 2, 3, 4, 5, 13 or 14 of the periodic table. As such a carrier, it is preferable to use silica, alumina, silica-alumina, or a mixture thereof, clay or modified clay or a mixture thereof, and more preferably silica having spherical particles may be used. The inorganic oxide carrier must be removed from water or a hydroxyl group (—OH) before use, which may be performed through heat treatment. The heat treatment of the porous carrier is performed by heating the carrier to a temperature of 200 to 800° C. while fluidizing the carrier in a vacuum or nitrogen atmosphere. The porous carrier is used in the form of a dried powder, and has an average particle size of about 1 to 250 μm, preferably 10 to 150 μm, and a surface area of about 5 to 1,200 m2/g, preferably about 50 to 500 m2/g. The pore volume of the porous carrier is 0.1 to 5 cm3/g, preferably 0.1 to 3.5 cm3/g, and the pore size is about 5 to 50 nm, preferably 7.5 to 35 nm. Preferably about 0 to 3 mmol of a hydroxyl group (—OH) is present per 1 g of silica on the surface of the porous carrier, and more preferably, 0.5 to 2.5 mmol of a hydroxyl group (—OH) is present. The amount of such a hydroxyl group (—OH) depends on the dehydration or calcination temperature of the carrier.

The supported catalyst can be prepared by various methods. In one method, the metallocene catalyst component and an activator are dissolved in a solvent and reacted for a certain time, then a porous carrier is added to react under specific conditions, and then washed and dried to complete the supported catalyst.

According to the present disclosure, the antistatic agent comprising diglycerol oleate and the metallocene catalyst composition are used together to form an olefin polymer, and, thus, in the olefin polymerization process, a discontinuity event due to a sheeting or drooling phenomenon can be effectively reduced, so that a long continuous operation is possible, and the resulting final product can be applied to various applications including food contact applications.

Hereinafter, the present disclosure will be described in more detail through examples, but the following examples are provided to illustrate the present disclosure, and the present disclosure is not limited by the following examples.

Antistatic agents and catalysts used in the following Comparative Examples and Examples are as follows.

Statsafe 6000: polysulfones, polyamines, sulfonic acids, Castor Oil and heptane, and are available from Innospec.

Antistatic agent according to the present disclosure: diglycerol oleate

Zirconium-based metallocene supported catalyst: Metallocene-supported catalyst in a solid form prepared using bis(1-butyl-3-methylcyclopentadienyl)zirconium dichloride (manufactured by s-PCI, South Korea) as a catalyst component, 20 wt % MAO toluene solution (manufactured by Albemarle) as a co-catalyst, and silica as a carrier (product name: ES70X, manufactured by PQ).

The polymerization reactions described in Polymerization Comparative Example 1 and Polymerization Examples 1 and 2 and Polymerization Experimental Examples 1 and 2 below are a continuous pilot-scale gas phase fluidized bed reactor (a loop reactor for prepolymerization is connected in series at the front end of the fluidized bed reactor), and the fluidized bed was composed of polymer particles. Gas feed streams of ethylene and hydrogen along with 1-hexene as liquid comonomers were introduced into the recycle gas lines of the loop reactor for prepolymerization and the gas phase fluidized bed reactor respectively. The individual flow rates of ethylene, hydrogen and 1-hexene were controlled to keep the composition inside the reactor constant. The ethylene concentration was controlled to maintain a constant ethylene partial pressure. Hydrogen was controlled to maintain a constant hydrogen to ethylene molar ratio. 1-Hexene was controlled to maintain a constant 1-hexene to (ethylene+1-hexene) molar ratio. A relatively constant gas composition was ensured in the recycle gas stream by measuring the concentration of each gas in the reactor using an on-line gas chromatograph. The zirconium-based metallocene-supported catalyst was introduced into a loop reactor for pre-polymerization using propane after propane soaking. A constant production rate was maintained by controlling the amount of catalyst injection.

The reaction bed of growing polymer particles was maintained fluidized by a continuous flow of propane gas and make-up feed through the reaction zone. This was achieved using an apparent gas velocity of 0.7 to 0.9 m/s. The reactor pressure was maintained at 20 kg/cm2, and the reaction temperature was maintained at 73° C. The fluidized bed was maintained at a constant height by discharging a portion of the bed at a rate equal to the rate of formation of a particulate product. Product formation rates (polymer formation rates) ranged from 10 to 20 kg/h. Product was removed semi-continuously through a series of valves into the fixed volume chamber. This product was purged to remove entrained hydrocarbons and treated with a small amount of humidified nitrogen steam to inactivate any traces of residual catalyst.

The liquid antistatic agent was diluted with hexane (5 or 13% by weight) and then injected into a loop reactor for pre-polymerization, fluidized bed reactor, and a line connecting the loop reactor and the fluidized bed reactor. When it was determined that the material flow inside the reactor due to static electricity was not smooth by monitoring the temperature, pressure, and density profile inside the reactor during polymerization, the amount of the antistatic agent was changed to lower the static electricity level. When an appropriate amount of the antistatic agent was added, it was confirmed that the material flow inside the reactor became smooth again. At the three antistatic agent injection points, the flow rate of the antistatic agent was independently controlled. If the antistatic agent injection flow rate is independently adjusted at the three antistatic agent injection points according to the monitoring result, it is possible to more efficiently lower the static electricity level and make the material flow smoothly. Polymerization methods and experimental results according to specific Comparative Examples and Examples are as follows.

Polymerization Comparative Example 1

Preparation of Polyolefin Polymer (Using Statsafe 6000)

The test was performed in the polymerization reactor system described above, and Statsafe 6000 was used as an antistatic agent, and the process stability thereof was evaluated. Using the zirconium-based metallocene supported catalyst described above, the reactor was carried out under conditions: a reaction temperature of 73° C., a reaction pressure of 20 kg/cm2, 1-hexene to (ethylene+1-hexene) molar ratio of 1:0.02 to 0.025, hydrogen to ethylene molar ratio of 1:0.0002 to 0.00025. Polyethylene having a melt index of 0.90 g/10 min (MI2.16, 190° C., 2.16 kg load condition) and a density of 0.9164 g/cm3 was produced. A liquid antistatic agent (Statsafe 6000) diluted with hexane was used, and injected in a loop reactor for pre-polymerization; fluidized bed reactor; and a line connecting the loop reactor and the fluidized bed reactor. At the beginning of the polymerization reaction, Statsafe 6000 diluted with hexane (13% by weight) was added to a loop reactor for prepolymerization; fluidized bed reactor; and a line connecting the loop reactor and the fluidized bed reactor in the amount of 50 g/h, 20 g/h, and 20 g/h, respectively. For the resulting polymer, the antistatic agent concentration averaged 165 ppmw.

Polymerization Example 1

Preparation of Polyolefin Polymer (Experiment for Antistatic Agent Input Amount)

Polymerization was carried out in the same manner as in Polymerization Comparative Example 1, and the reaction was carried out under conditions of 1:44 in a molar ratio of 1-hexene to (ethylene+1-hexene) and 1:4,450 in a molar ratio of hydrogen to ethylene to determine the amount of the antistatic agent according to the present disclosure, except that diglycerol oleate diluted with hexane (5% by weight) was added to a loop reactor for prepolymerization; fluidized bed reactor; and a line connecting the loop reactor and the fluidized bed reactor in the amount of 50 g/h, 20 g/h, and 20 g/h, respectively. Under the same polymerization reactor system and polymerization conditions as those of Polymerization Comparative Example 1, reactor fouling according to a change in the amount of diglycerol oleate added, catalyst productivity (mileage, weight of polymer formed per unit weight of catalyst), and polymer properties (melt index (MI2.16), density) was compared, and the results are shown in Table 1 below.

TABLE 1

| Diglycerol oleate, ppmw (Compared to total feed) | Melt index (MI2.16), g/10 min | Density, g/cm$^3$ | Mileage (catalyst productivity), g-PE/g-Cat | Fouling |
|---|---|---|---|---|
| 0 | 0.89 | 0.9178 | 730 | Poor |
| 2 | 0.94 | 0.9172 | 1,371 | Good |
| 51 | 0.93 | 0.9157 | 1,498 | Good |
| 60 | 0.97 | 0.9164 | 1,473 | Good |
| 162 | 0.75 | 0.9158 | 1,379 | Good |
| 970 | 0.79 | 0.9153 | 1,162 | Good |
| 1,600 | 0.84 | 0.9166 | 864 | Good |

Referring to Table 1, in the case of mileage (catalyst productivity), at a specific input amount of diglycerol oleate (51 to 60 ppmw, compared to total feed), a relatively high mileage (catalyst productivity) of 1,400 g/g or more was shown. When diglycerol oleate was not added or an excess (1,600 ppmw) was added, a low mileage (catalyst productivity) of 1,000 g/g or less was shown.

In the case of reactor inner wall fouling, it was good when the input amount of diglycerol oleate was 2 ppmw or more. Based on this result, the input amount of diglycerol oleate according to the present disclosure may be 2 to 1,000 ppmw, preferably 50 to 60 ppmw. When the input amount is 1,600 ppmw or more, it is disadvantageous in terms of mileage (catalyst productivity), and when it is less than 2 ppmw, it is disadvantageous in terms of both mileage (catalyst productivity) and fouling. Therefore, in Polymerization Example 2 and Polymerization Experimental Examples 1 and 2 below, diglycerol oleate at a concentration of 50 to 120 ppmw compared to total feed was added.

Polymerization Example 2

Preparation of Polyolefin Polymer (Antistatic Agent: Diglycerol Oleate)

Polymerization was carried out in the same manner as in Polymerization Comparative Example 1, except that diglycerol oleate diluted with hexane (5% by weight) was added to a loop reactor for prepolymerization; fluidized bed reactor; and a line connecting the loop reactor and the fluidized bed reactor in the amount of 50 g/h, 20 g/h, and 20 g/h, respectively, in an online T/C (Type/Change) method. The antistatic agent concentration in the resulting polymer averaged 55 ppmw for the polymer product.

Polymerization Experimental Example 1

Preparation of Polyolefin Polymer (Antistatic Agent: Diglycerol Oleate/Statsafe 6000 Mixture (1:1, w/w))

In order to confirm the mixing effect of different types of liquid antistatic agents, polymerization was carried out in the same manner as in Polymerization Comparative Example 1, except that diglycerol oleate and Statsafe 6000 were mixed in a weight ratio of 1:1, and then a liquid antistatic agent diluted with hexane (5% by weight) was added after Polymerization Example 2 to a loop reactor for prepolymerization, fluidized bed reactor, and a line connecting the loop reactor and the fluidized bed reactor in the amount of 50 g/h, 20 g/h, and 20 g/h, respectively, by online T/C. The antistatic agent concentration in the polymer averaged 61 ppmw for the polymer product.

Polymerization Experimental Example 2

Preparation of Polyolefin Polymer (Antistatic Agent: Diglycerol Oleate Input Volume Increase Experiment)

Polymerization was carried out in the same manner as in Polymerization Comparative Example 1, except that after online T/C was performed again with the diglycerol oleate diluted solution according to the present disclosure from the 1:1 mixed antistatic agent diluted solution in Polymerization Experimental Example 1, the flow rate input to the fluidized bed reactor was increased from 20 g/h to 100 g/h to confirm the effect of increasing the input amount of diglycerol oleate. The antistatic agent concentration in the resulting polymer averaged 120 ppmw for the polymer product.

Experimental Example 1

Polymer Analysis Result

The melt index and density of the polymers formed in the experiments performed in Polymerization Comparative Example 1, Polymerization Example 2, and Polymerization Experimental Examples 1 and 2 were measured and shown in Table 2 below.

TABLE 2

| Classification | Melt index (MI2.16), g/10 min | Density, g/cm3 |
|---|---|---|
| Polymerization Comparative Example 1 | 0.90 | 0.9164 |
| Polymerization Example 2 | 0.92 | 0.9161 |
| Polymerization Experimental Example 1 | 0.98 | 0.9169 |
| Polymerization Experimental Example 2 | 0.74 | 0.9148 |

Referring to Table 2 above, by controlling the individual flow rates of ethylene, hydrogen and comonomer, it can be seen that the polymers formed during the 7-day experiment conducted by Polymerization Comparative Example 1 and Polymerization Example 2 and Polymerization Experimental Examples 1 and 2 have similar melt index and density.

Experimental Example 2

Internal Temperature Profile Results of Fluidized Bed Reactor

Figure 2:
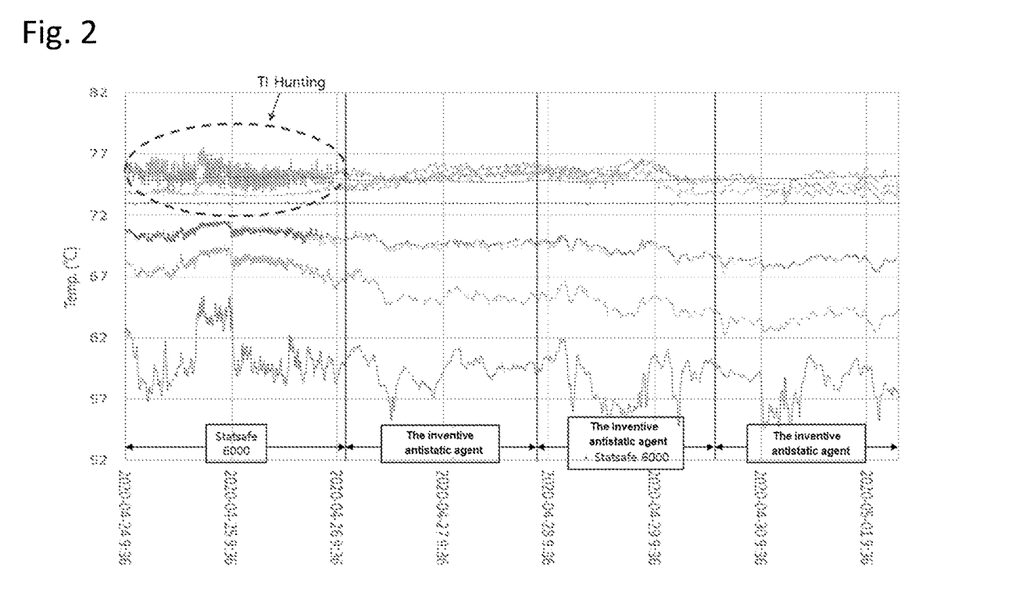
FIG. 2 shows the results of an internal temperature profile of a fluidized bed reactor according to an embodiment of the present disclosure.

FIG. 2 shows the temperature profile inside the fluidized bed reactor collected during the tests conducted by the Polymerization Comparative Example and Polymerization Example. As shown in FIG. 2, no discontinuity event occurred during the 7-day test conducted by Polymerization Comparative Example 1 and Polymerization Example 2 and Polymerization Experiment Examples 1 and 2. It can be seen that the temperature change range was narrow in Polymerization Example 2 and Polymerization Experiment Examples 1 and 2 (using diglycerol oleate as an antistatic agent) compared to Comparative Polymerization Example 1 (using Statsafe 6000). Compared to Statsafe 6000, the reduction in temperature change by using the antistatic agent (diglycerol oleate) according to the present disclosure can be considered to result from the formation of a more stable fluidized bed by more efficient electrostatic control.

Experimental Example 3

Antistatic Agent Input Amount and Catalyst Productivity Results

Figure 3:
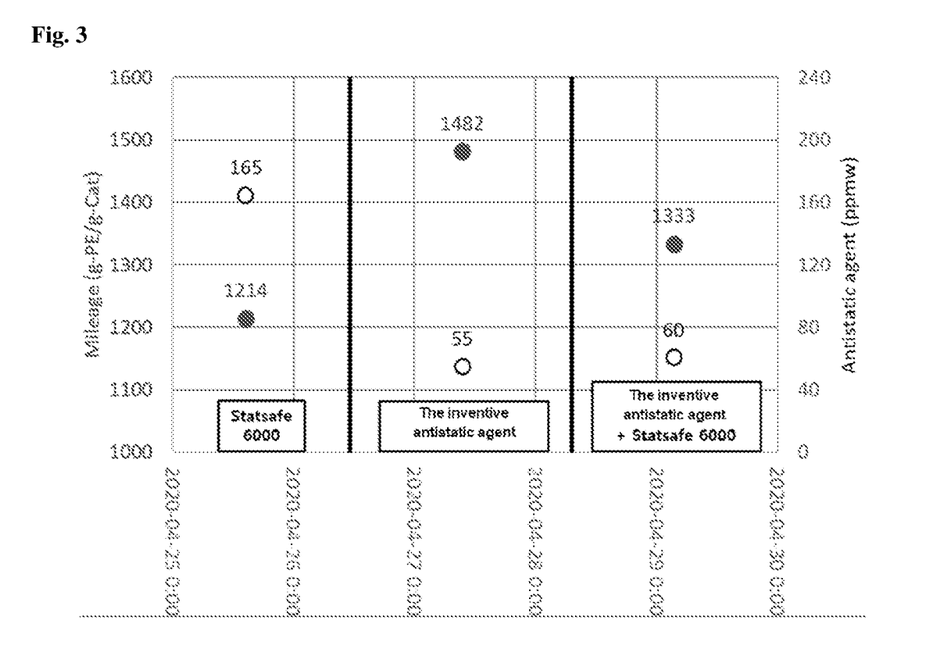
FIG. 3 shows an antistatic agent input amount and catalyst productivity results according to an embodiment of the present disclosure.

FIG. 3 shows the input amount (concentration, ppmw) of the antistatic agent and thus the catalyst productivity (mileage, the weight of the polymer formed per unit catalyst weight). As confirmed in FIG. 3, it indicates that since the antistatic agent (diglycerol oleate) according to the present disclosure provided excellent process stability even at a lower antistatic agent concentration compared to Statsafe 6000, the antistatic agent acting as a catalyst poison was used less, so that the catalyst productivity improved by more than 20% compared to Statsafe 6000.

The invention claimed is:

1. An olefin polymerization method, comprising:
   forming an antistatic mixture in which an antistatic agent containing diglycerol oleate is mixed with a low molecular weight hydrocarbon;
   supplying the antistatic agent mixture and a metallocene-based catalyst composition comprising a metallocene catalyst and an aluminoxane to two or more polymerization reactors; and
   polymerizing one or more alpha-olefins in the presence of the antistatic agent mixture and the metallocene-based catalyst composition;
   wherein the two or more polymerization reactors comprise a prepolymerization loop reactor for prepolymerizing ethylene with one or more alpha-olefins in the presence of an antistatic agent mixture and a metallocene-based catalyst composition, and a fluidized bed reactor connected with the prepolymerization loop reactor in series for polymerizing a prepolymer to form an olefin polymer, and wherein the antistatic agent mixture is supplied to a prepolymerization loop reactor, the fluidized bed reactor, and a line connecting the prepolymerization loop reactor and the fluidized bed reactor.

2. The olefin polymerization method of claim 1, wherein the low molecular weight hydrocarbon is selected from the group consisting of hexane, heptane, toluene, mineral oil and mixtures thereof.

3. The olefin polymerization method of claim 1, wherein the low molecular weight hydrocarbon is a saturated hydrocarbon having 6 to 40 carbon atoms.

4. The olefin polymerization method of claim 1, wherein the antistatic agent mixture is supplied to the polymerization reactor independently of the metallocene-based catalyst composition or is supplied in a mixed form.

5. The olefin polymerization method of claim 1, wherein the one or more alpha-olefins are at least one selected from the group consisting of ethylene, propylene, 1-butene, 1-pentene, 4-methyl- 1-pentene, 1-hexene, 1-heptene, 1-octene, 1-decene, 1-undecene, 1-dodecene, 1-tetradecene, 1-hexadecene, 1-octadecene, and 1-eicosene.

6. The olefin polymerization method of claim 1, wherein the olefin polymer has a melt index (MI2.16, 190° C., 2.16 kg load condition) of 0.01 to 15 g/10 min, and a density of 0.88 to 0.98 g/cm$^3$.

* * * * *